(12) United States Patent
Koshkina et al.

(10) Patent No.: US 7,206,150 B2
(45) Date of Patent: Apr. 17, 2007

(54) IN SITU MEDIA DEFECT IMAGE ANALYSIS

(75) Inventors: Olga Valerievna Koshkina, Longmont, CO (US); Badih MohamadNaji Arnaout, Loveland, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 288 days.

(21) Appl. No.: 09/944,925

(22) Filed: Aug. 31, 2001

(65) Prior Publication Data

US 2002/0181133 A1 Dec. 5, 2002

Related U.S. Application Data

(60) Provisional application No. 60/296,025, filed on Jun. 4, 2001.

(51) Int. Cl.
*G11B 5/02* (2006.01)
(52) U.S. Cl. .............................. 360/53; 360/31; 360/25
(58) Field of Classification Search .................. 360/31, 360/53, 25; 224/212
See application file for complete search history.

(56) References Cited

U.S. PATENT DOCUMENTS

| | | | |
|---|---|---|---|
| 4,881,136 A | 11/1989 | Shiraishi et al. | |
| 4,929,894 A | 5/1990 | Monet | |
| 4,930,026 A | 5/1990 | Kljuev et al. | |
| 5,121,057 A | 6/1992 | Huber et al. | |
| 5,130,866 A | 7/1992 | Klaassen et al. | |
| 5,212,677 A * | 5/1993 | Shimote et al. | 369/53.17 |
| 5,424,638 A | 6/1995 | Huber | |
| 5,527,110 A * | 6/1996 | Abraham et al. | 374/5 |
| 5,563,746 A | 10/1996 | Bliss | |
| 5,754,353 A | 5/1998 | Behrens et al. | |
| 5,808,184 A | 9/1998 | Boutaghou et al. | |
| 5,987,634 A | 11/1999 | Behrens et al. | |
| 6,088,176 A * | 7/2000 | Smith et al. | 360/46 |
| 6,151,180 A * | 11/2000 | Bang | 360/53 |
| 6,229,968 B1 | 5/2001 | Martin et al. | |

(Continued)

OTHER PUBLICATIONS

I.D. Mayergoyz, et al., "Magnetic Imaging on a Spin-Stand," Journal of Applied Physics. American Institute of Physics (US), vol. 87 (No. 9), p. 6824-6826, (May 1, 2000).
K.B. Klaassen, et al., "Effect of Thin-Film Disk Texture on Magnetic Recording Signals," Journal of Applied Physics, American Institute of Physics (US), vol. 73 (No. 10), p. 5554-5556, (May 15, 1993).

*Primary Examiner*—Andrea Wellington
*Assistant Examiner*—Varsha A. Kapadia
(74) *Attorney, Agent, or Firm*—Fellers, Snider, et al.

(57) ABSTRACT

The present invention is a method or apparatus configured for analyzing a data storage device containing a transducer head positionable adjacent a data storage media surface. First, a defect is detected in a region of the surface. Two or more readback signals are obtained, each received during a respective pass of the transducer head adjacent the defective region. The signals are then combined to define a category for the defective region, either automatically or by visual examination of an image. Preferably, all of the read signals are received from the transducer head while the data storage device remains sealed in a substantially opaque chamber. That way, the media defects of an entire population of data storage devices can be analyzed quickly, disassembling the drives for direct visual analysis only on a selective basis.

16 Claims, 8 Drawing Sheets

U.S. PATENT DOCUMENTS

| | | |
|---|---|---|
| 6,279,118 B1 | 8/2001 | Kang |
| 6,384,995 B1 * | 5/2002 | Smith .......................... 360/31 |
| 6,628,465 B2 * | 9/2003 | Yong ........................... 360/31 |
| 2002/0048112 A1 * | 4/2002 | Chu et al. ..................... 360/75 |

* cited by examiner

IN SITU MEDIA DEFECT IMAGE ANALYSIS

RELATED APPLICATIONS

This application claims priority of U.S. provisional application Ser. No. 60/296,025, filed 4 Jun. 2001.

FIELD OF THE INVENTION

This application relates generally to data storage devices and more particularly to an apparatus and method for analyzing media defects.

BACKGROUND OF THE INVENTION

Data information is stored in a magnetic medium by magnetizing a small area of the magnetic media. Small, random defects or flaws in the thin layer of magnetic material for a rigid disc can result in storage and subsequent playback of erroneous data bits. These erroneous data bits are created when data information is initially written into a defective area of the disc. These erroneous data bits are then subsequently read from the disc. A data bit error for a particular bit corresponding to a particular area of the disc is caused either by the magnetization for a bit being missing or by magnetization being added at the storage location. To locate defects in the thin layer of magnetic material of a disc, a typical prior art technique is to perform a surface analysis of the thin layer of magnetic material on the disc and to produce an error map for the recording surface of the disc. The error map is then used to avoid the defective areas of the disc during subsequent recording and playback of data information. To perform a surface analysis, the disc is formatted and the locations of defects are stored in the header fields at the beginning of the data records stored on the various tracks of a disc. During read/write operations, the headers are looked at to avoid the defective recording areas on the disc.

To detect flaws in magnetic media for a disc storage device, a test signal such as a high frequency, alternating data pattern is written onto the disc. This pattern is then read out of the disc as a high frequency output test signal which has a sinusoidal waveform. This high frequency output test signal with its sinusoidal waveform is then observed for deviations from an expected sinusoidal waveform to indicate the occurrence of a defect on the disc. Historically, it was necessary to write and rewrite such a test pattern on the disc a number of times. This was because flaw-detection systems used narrow-band tracking notch filters to remove the expected sinusoidal signal and to pass only those sidebands representing error information. A narrow-band tracking filter using a delay line is disclosed in U.S. Pat. No. 4,929,894 ("Method and Apparatus for Increasing Throughput on Disc Drive Quality Control Testing") issued to M. Monett on 29 May 1990. In the frequency domain, the defect information is in the form of sidebands around the carrier. These sidebands are produced by amplitude and phase modulation of the test pattern by the defects on the disc.

U.S. Pat. No. 4,881,136 ("Method and Apparatus for Detecting Minute Defects on Magnetic Disc by Monitoring Both Amplitude Decrease and Phase Shift of a Reproduced Signal") issued to K. Shiraishi et al. on 14 Nov. 1989 discloses a disc-error detection system which makes repeated passes to detect errors in a continuous signal and which uses peak-to-peak amplitude detectors. An analog signal-processing apparatus for detecting a flaw in a magnetic media is disclosed in U.S. Pat. No. 5,121,057 ("Media Flaw Detection Apparatus for a Magnetic Disc Drive with Squaring and Summary of In-Phase and Quadrature-Phase Detected Signals") issued to W. Huber et al. on 9 Jun. 1992. This patent discloses analog techniques for detection of flaws in a magnetic media. In one embodiment, an analog input signal is multiplied by an in-phase reference signal and also by an analog quadrature-phase reference signal, using a pair of balanced modulators as analog multipliers. The analog output signals from each of the analog multipliers are then squared and summed together to produce an analog signal which is representative of a flaw in the magnetic media.

Although significant technology exists for detecting flaws in magnetic media, existing techniques for analyzing the defects (other than asperities) have limited use. One example is U.S. Pat. No. 5,563,746 ("Real Time Media Defect Scanning in a Sampled Amplitude Read Channel") issued to W. Bliss on 8 Oct. 1996. Although this discloses distinguishing between types of media defects by passing a single readback signal through each of several defect filters, its effectiveness is limited because a single readback signal can easily lack crucial information about a defective region. Moreover this method fails to provide any mechanism for recording an image of the defect for further reference and analysis. Accordingly, there is a continuing need for an apparatus and method for enabling media defect image analysis that provides useful information about media defects without necessitating disassembly of the disc drive.

SUMMARY OF THE INVENTION

The present invention is a method or apparatus for analyzing a data storage device containing a transducer head positionable adjacent a data storage media surface. First, a defect is detected in a region of the surface. Two or more readback signals are obtained, each received during a respective pass of the transducer head adjacent the defective region. The signals are then combined to define a category for the defective region, either automatically or by visual examination of an image. Preferably, all of the read signals are received from the transducer head while the data storage device remains sealed in a substantially opaque chamber. That way, the media defects of an entire population of data storage devices can be analyzed quickly, disassembling the drives for direct visual analysis only on a selective basis.

These and various other features as well as additional advantages which characterize the present invention will be apparent from a reading of the following detailed description and a review of the associated drawings.

DETAILED DESCRIPTION

Numerous aspects of data storage device technology that are not a part of the present invention (or are well known in the art) are omitted for brevity, avoiding needless distractions from the essence of the present invention. For example, this document does not include much detail about conventional failure analysis, whereby likely causes for a failure are ascertained and evaluated in terms of the risk of lost performance, and particularly of lost user data. Neither does it include much detail about read channels or about how groups of binary data bits are conventionally encoded so that magnetic transitions are dispersed fairly uniformly across recording surface regions containing digital data. Neither does it include details about how to modify defect tables so as to avoid using portions of media that are bad or at risk. Although the examples below show more than enough detail to allow those skilled in the art to practice the present invention, subject matter regarded as the invention is broader than any single example below. The scope of the present invention is distinctly defined, however, in the claims at the end of this document.

Definitions and clarifications of certain terms are provided in conjunction with the descriptions below, all consistent with common usage in the art but some described with greater specificity. As used herein, for example, an "image" of a media defect includes any plotted array of points indicative of a layout of the defect in the plane of a data storage surface. A defect's image is "useful" if it characterizes a defect's shape more descriptively than as a mere point or one-dimensional phenomenon. Examples are shown in FIGS. 2–4, 6, 7 & 9. A defective region is "unreliable" if it is a carbon void or is otherwise attributable to corrosion, or if it is of a category that is treated stringently, such as by disqualifying a larger portion of nearby media than would be appropriate for another category of defect. A data sector is "near" a defective region if it is within at most L/2 of the defective region, where L is an estimate of the length of the defect in its longest dimension. See FIG. 3 for an example.

Figure 1:
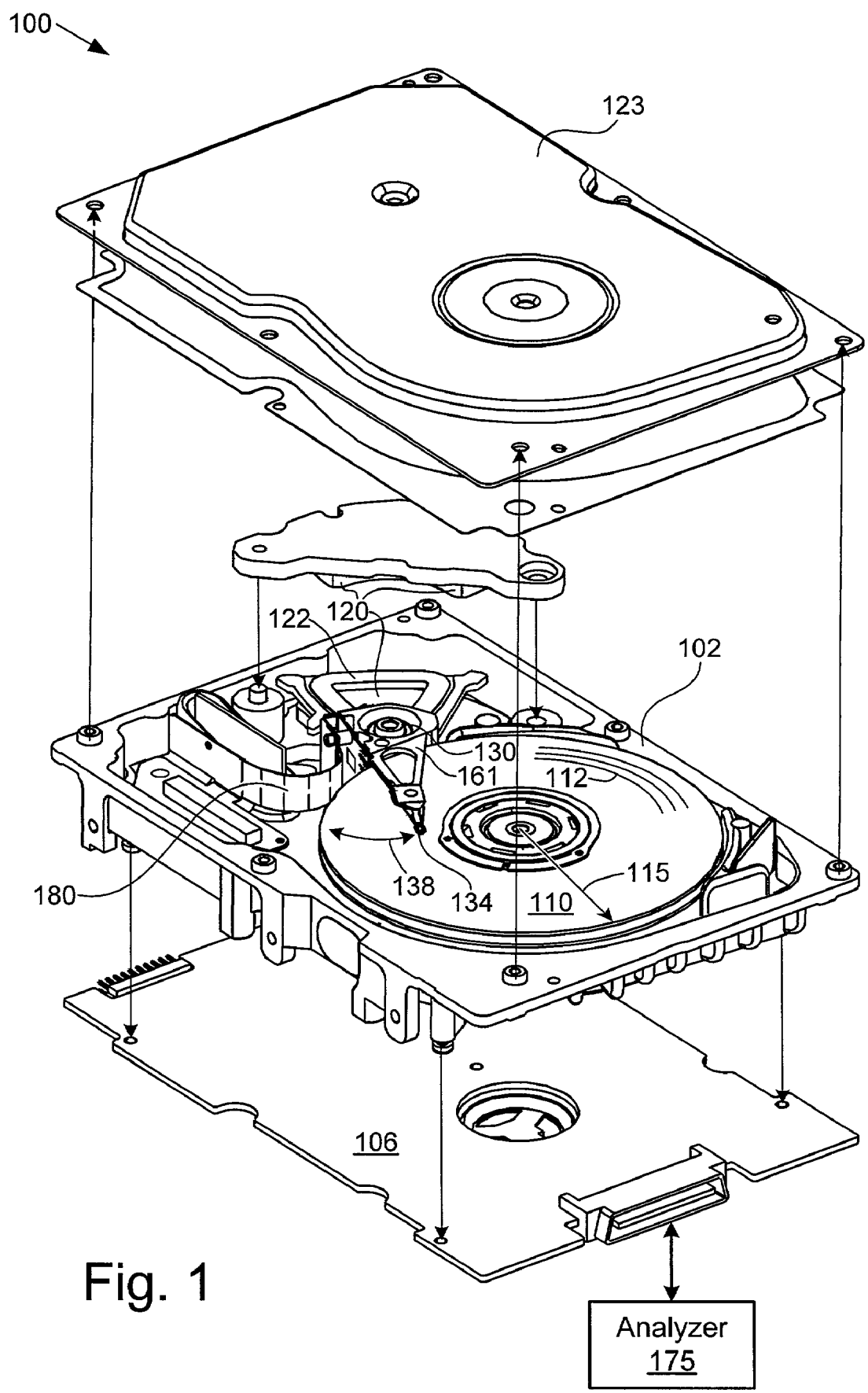
FIG. 1 a data storage device coupled to an analyzer, configured to perform (or help to perform) the method of the present invention.

Turning now to FIG. 1, there is shown a data storage device 100 constructed in accordance with a preferred embodiment of the present invention. Device 100 is a disc drive including base 102 to which various components are mounted. Top cover 123 cooperates with base 102 conventionally to form a sealed, substantially opaque chamber. The components include a spindle motor which rotates one or more data storage discs 110 at a constant high speed. Information is written to and read from tracks 112 on discs 110 through the use of an actuator assembly 161, which rotates during a seek operation about a bearing shaft assembly 130 positioned adjacent discs 110. Actuator assembly 161 includes a plurality of actuator arms which extend above and below discs 110, with one or more flexures extending from each of the actuator arms. Mounted at the distal end of each of the flexures is a transducer head 134 which includes an air-bearing slider enabling transducer head 134 to fly in close proximity above the corresponding surface of associated disc 110.

Servo and user data travels through transducer head 134 and flex cable 180 to control circuitry on controller board 106. Flex cable 180 maintains an electrical connection by flexing as heads 134 traverse tracks 112 along their respective radial paths 138. By "radial," it is meant that path 138 is substantially aligned with a radius of the disc(s) 110, although their directions may be offset from a perfectly radial direction (such as 115) by up to about 20 degrees due to head skew, as is understood in the art.

Unlike prior art data storage devices, and as described below with reference to FIGS. 2–9, controller board 106 is configured to generate data derived from a plurality of readback signals each received during a respective pass of the transducer head adjacent the defective region. Data from these signals is combined to facilitate assigning a category for the defective region. To detect and analyze grown media defects, this assignment is preferably performed by circuitry on the controller board 106 during a periodic or power-on self-test. In addition, this assignment may be performed by an analyzer 175 coupled to the data storage device 100 and optionally by a yield enhancement engineer who has special expertise in analyzing media defects.

During a seek operation, the overall track position of transducer heads 134 is controlled through the use of a voice coil motor (VCM), which typically includes a coil 122 fixedly attached to actuator assembly 161, as well as one or more permanent magnets 120 which establish a magnetic field in which coil 122 is immersed. The controlled application of current to coil 122 causes magnetic interaction between permanent magnets 120 and coil 122 so that coil 122 moves in accordance with the well-known Lorentz relationship. As coil 122 moves, actuator assembly 161 pivots about bearing shaft assembly 130 and transducer heads 134 are caused to move across the surfaces of discs 161 between the inner diameter and outer diameter of the disc(s) 161. Fine control of the position of head 134 is optionally made with a microactuator (not shown) that operates between the flexure and the actuator arm.

Figure 2:
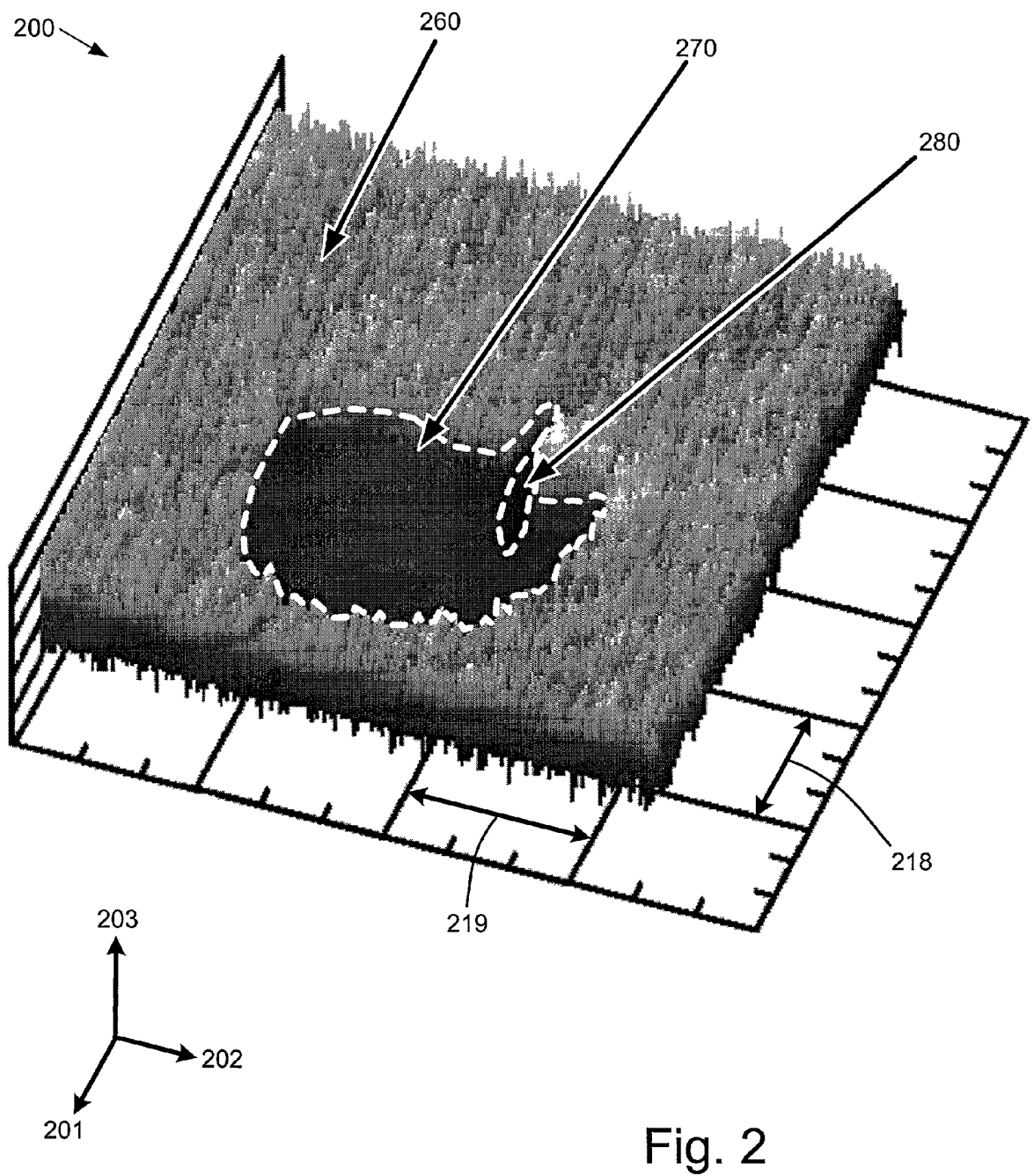
FIG. 2 shows a three dimensional image of part of a recording surface of a data storage disc like those of FIG. 1.

Turning now to FIG. 2, there is shown a three dimensional image 200 of a portion of a recording surface of a disc like disc 110 of FIG. 1. The X-dimension 201 of the image is substantially aligned with a radius of the disc. Major increment 218 corresponds to a width of several data tracks. The Y-dimension 202 of image 200 is substantially aligned along the annular data tracks of the disc, so that the data surface corresponds to the (horizontal) X-Y plane. Although major increment 219 may be expressed in units of time, its scale is selected so that image 200 is substantially to scale in the X-Y plane. Vertical increments (i.e. in the Z-dimension 201) may be expressed in units of voltage, and are preferably magnified so as to show the shape of a defective region.

It should be understood that digital data on a disc surface is conventionally encoded so that magnetic transitions are dispersed fairly uniformly. That is why a large majority 260 of the surface shown in image 200 has a fairly uniform, high magnitude signified by a light hue. A smaller, roundish region 270 is shown, however, that clearly has an intermediate magnitude. This region is a defect in the media surface that causes a weaker magnetic field to be sensed whenever a transducer head passes across it. A very small region 280 is also shown in a much darker hue, indicating a small zone with a near-zero magnitude. This region has little or no magnetic material, which is why it is not apparent that 1's and 0's have been written on it. To aid readers who may have a poorly-scanned version of FIG. 2, thick white dashed outlines of the defective regions 270,280 are drawn over image 200.

Figure 3:
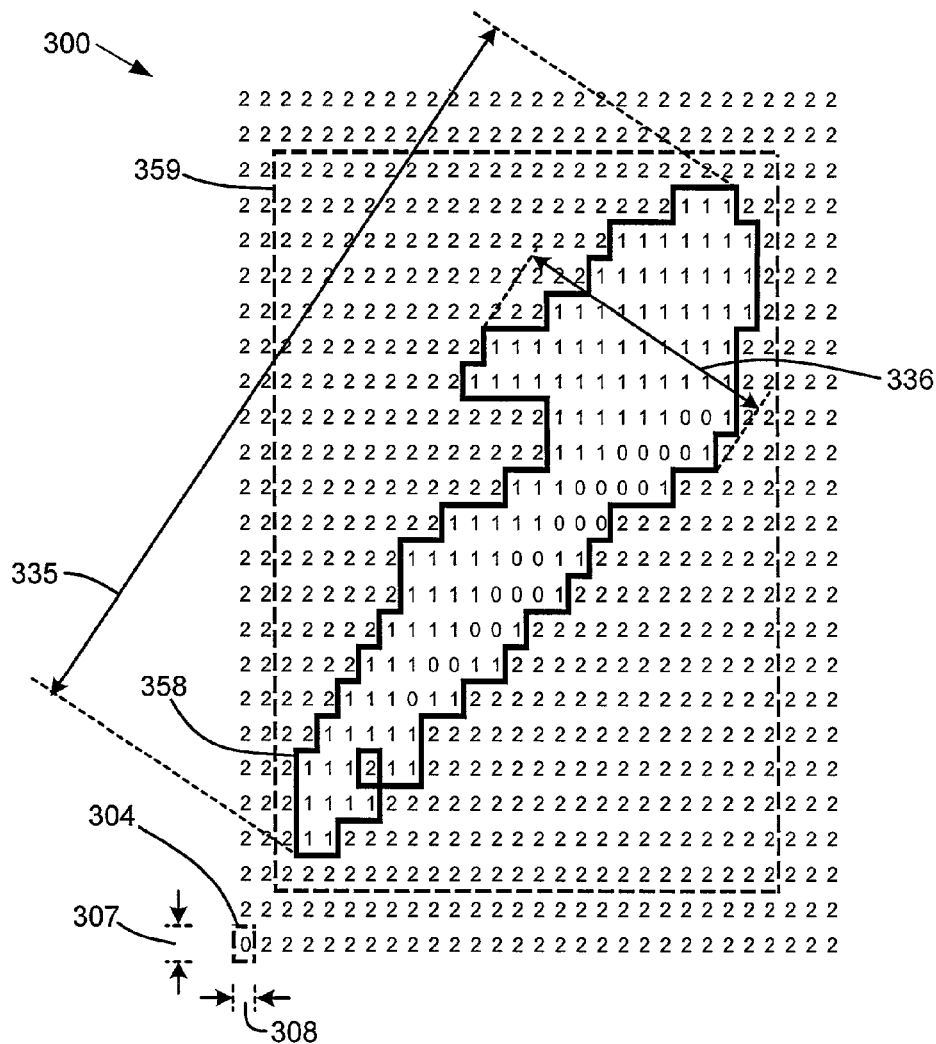
FIG. 3 shows a two-dimensional representation of a media surface having a defective portion shown with a thick black outline.

FIG. 3 shows a two-dimensional representation of a data storage surface 300 having a defective portion shown with a thick black outline 358. The surface is made up of "cells" 304 shaped as parallelograms of substantially uniform size. (For simplicity, the depicted example shows rectangular cells such as would be used for depicting a defect in a region of near-zero head skew.) The width 307 of each cell 304 is nominally equal to one track pitch. The length 308 of each cell 304 is selected to be long enough that a fairly uniform number of magnetic transitions will be found inside. Typically, this length 308 will be long enough so that several bits can be stored in the cell.

In FIG. 3, each "2" in the grid corresponds to a cell having an average magnetic field strength that is substantially equal to a nominal value (i.e. at least 60% to 95% of the average field strength for used portions of the data surface 300). Each "0" in the grid corresponds to a cell having a near-zero magnetic field (i.e. less than about 5% to 50% of the nominal value). Each "1" in the grid corresponds to a cell having an intermediate field strength between these values. The defective portion outlined in thick black 358 contains 139 cells that have a "marginal" field strength, 23 of which have a "near zero" field strength. (It should be noted that the lower left cell 304 containing a "0" has been omitted from the count because it is separated from the others by more than one cell.) These counts of field strength gradations are useful for characterizing the defective region 358.

The layout of the defective region is also useful. For example, the length 335 of the defect (in its longest direction) is especially useful if it is longer that 2.5 times its width 336, which usually indicates a scratch. (Note that the computations of length and width desirably take into account head skew, which is negligible in the present example.)

The effective defect size (shown by rectangle 359) preferably provides a margin outside the detected defect size. In the present example, the guardband (i.e. margin) is equal to one cell. Preferably, the margin will be at least 2–5 cells for defective regions that are categorized as unstable.

Figure 4:
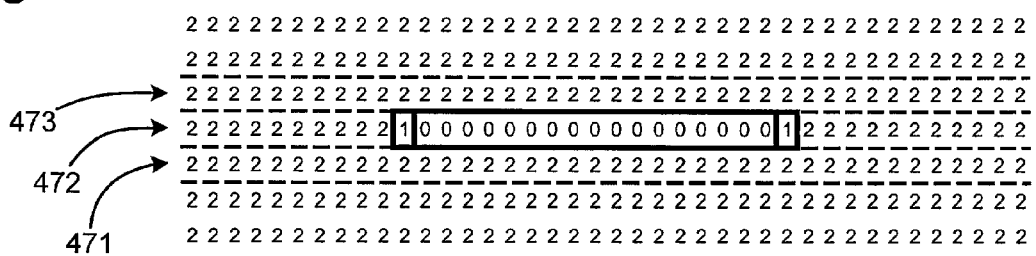
FIG. 4 shows a region of a disc surface having a data storage defect one track wide, indicating a likely skip write.

FIG. 4 shows a region 400 of a disc surface having a data storage defect one track wide. The defect, appearing on track 472, is several cells long. It has no apparent effect on adjacent tracks 471 and 473. This defect profile matches that of a skip write, which occurs when a transducer head encounters a dust particle and briefly bounces away from the data surface while trying to write data. In a preferred embodiment, the data storage device recognizes this kind of profile and responds by attempting to write magnetic transitions into the defect. A successful write signifies a confirmed skip write. An excessive number of skip writes indicates an excessive number of loose particles within the data storage device.

Figure 5:
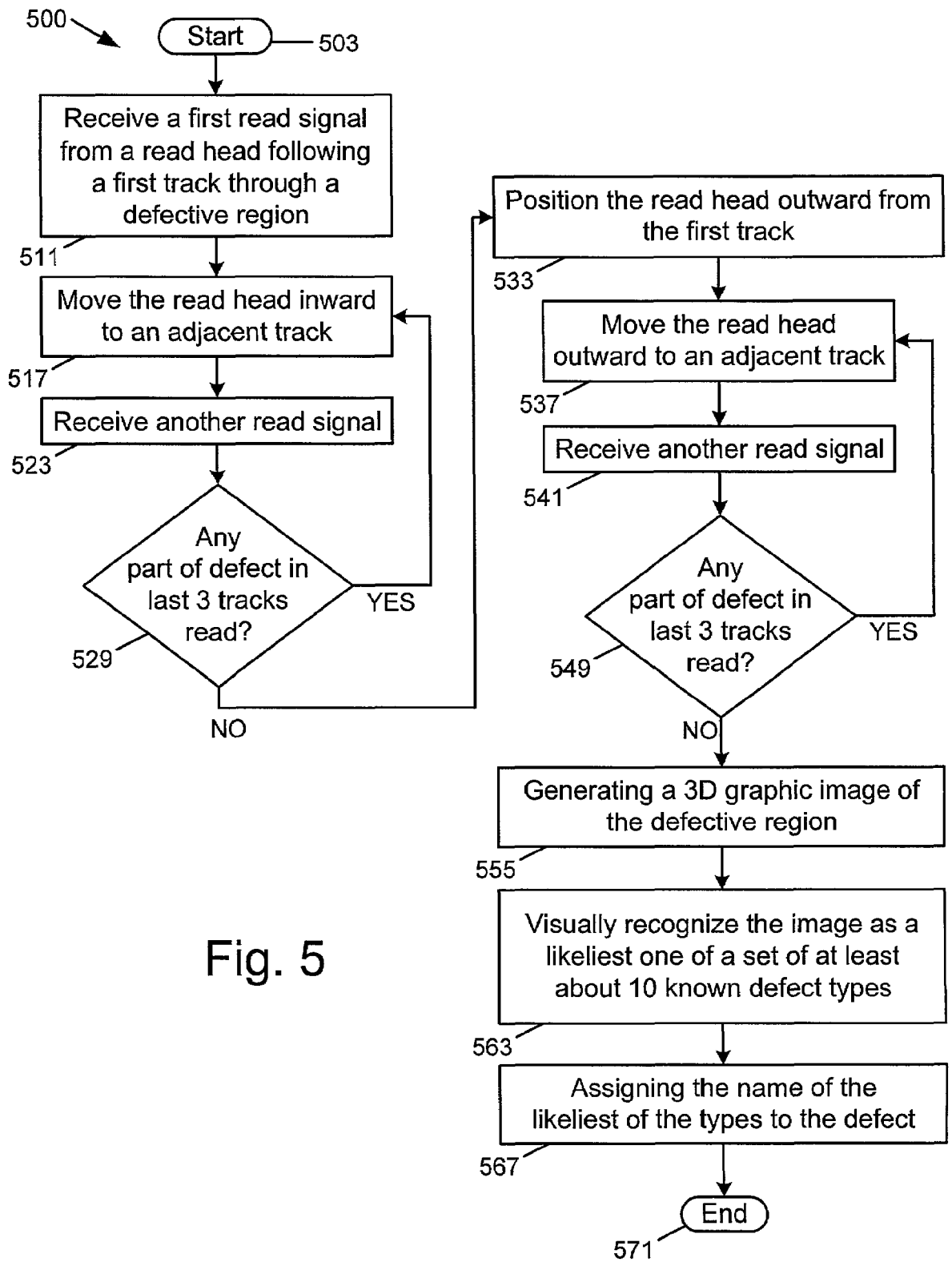
FIG. 5 shows a method suitable for a media defect analyst to automatically generate and use images like those of FIGS. 2–4.

FIG. 5 shows a method 500 for generating and using images like those of FIGS. 2–4, including steps 503 through 571. A first signal is received from a read head as it follows a first data track through a defective region 511. At step 517, the read head is moved a short radial increment (e.g. across at least 0.1 tracks and at most 10 tracks) to a location from which another read signal is received 523. It is noted whether the new read signal indicates a continuation of the defect being analyzed. Once three consecutive read signals indicate that a defect boundary has been found 529, the head is positioned on the other side of the first data track 533. By similar steps in the opposite radial direction 537,541,549, the opposite defect boundary is also found. (A "last track encountered" or similar error will terminate these defect boundary searches.)

The read signals thus gathered are combined to form a 3 dimensional graphic image of the defective region 555 like that of FIG. 2. This image is visually compared against a set of known defect categories 563 and assigned the name of the likeliest category 567. See FIG. 8 for profiles of "unreliable," "likely skip write," "likely scratch" and "miscellaneous" categories. This is a basic taxonomy, and is preferably adapted for a population of data storage devices for which it is used. For categories that include more than about 10% of the defects analyzed, it is suggested that classifications such as size be used to spawn more effective category descriptions. If large scratches are occurring for a given line of data storage devices, for example, a "large scratch" category will be appropriate for identifying defects having a length more than the width of 500 tracks. Most preferably, profiles for about 3–30 categories should be defined so that the number of defects in each category will be somewhat uniform.

Figure 6:
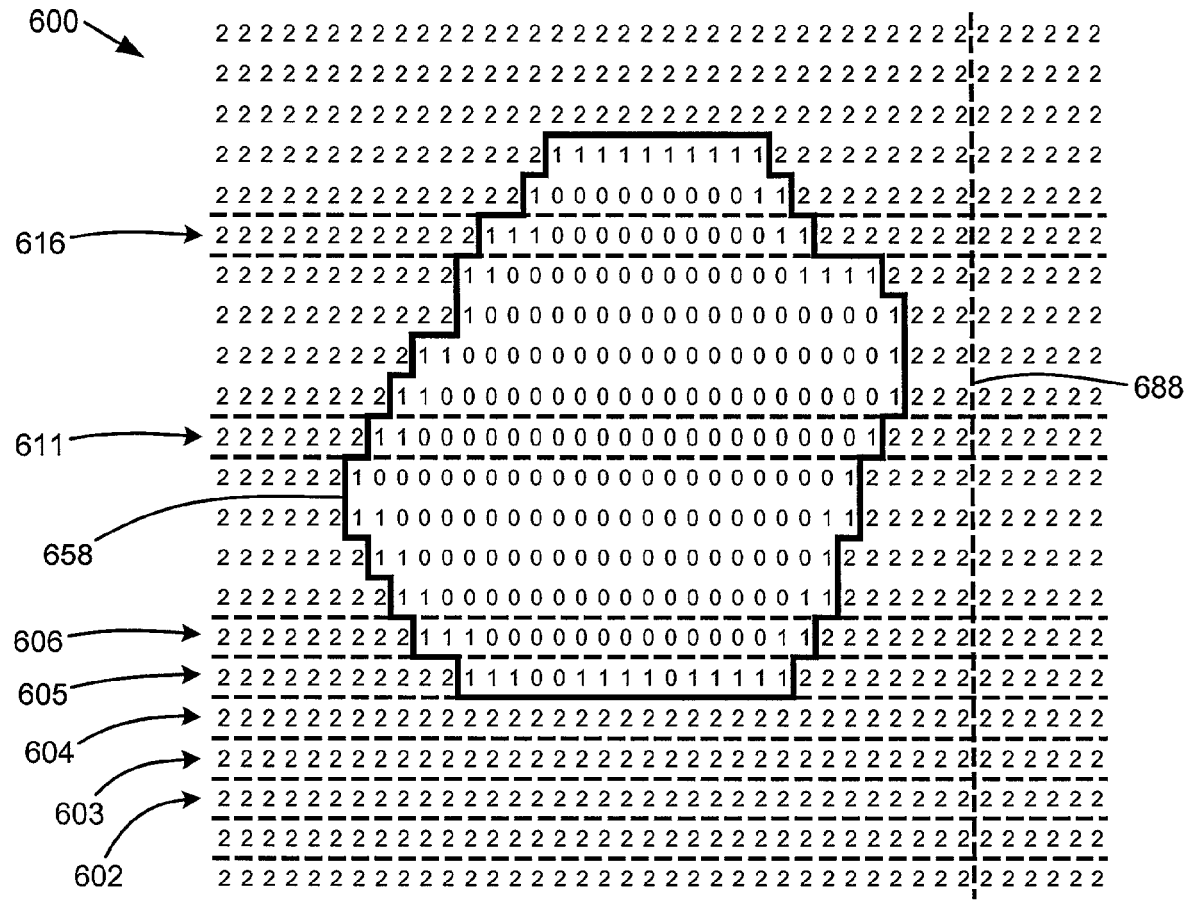
FIG. 6 shows a region of a magnetic media surface containing a defect categorized as "unstable."

FIG. 6 shows a region 600 of a magnetic media surface containing a defect 658 categorized as "unstable." This category of defect is also called a carbon void, generally identified with corrosion and/or a removal of material by blistering. Degradation of magnetic material around this category of defect is sometimes seen, and so the defect table is preferably modified to provide a guardband of three cell widths on each side of the defect. Thus the left portion of tracks 602, 603, and 604 will be indicated as defective even though no defect can be detected by a direct pass through these tracks.

Note that track 606 can serve as an example of a first track of step 511 (referring again to FIG. 5). At step 517, the transducer head seeks to track 605, the next adjacent track inward (i.e. down in FIG. 6). After reading track 605, a test is performed 529 to determine whether the defect 658 extends into any of the last three tracks read. This process is repeated until at track 602, it is determined that defect 658 does not extend into any of the last three tracks read 602,603,604. Therefore, the head is positioned somewhere outward from the first-read track 606. For example, the head may seek directly to track 611 or track 616.

A curvilinear, substantially radial boundary 688 also passes through region 600. (For a radial actuator, the shape of the boundary 688 is like that of the arcuate path 138 of the head 134 of FIG. 1.) Boundary 688 separates a servo data region from a user data region. A defect can be in either type of region, of course. It should be taken into account, though, that the field pattern within a servo region may not necessarily be as uniform. To analyze a media defect in a servo region with the present invention non-destructively, a programmer must take into account automatic gain control fields, synch marks, and servo bursts. Note that conventional synch marks are radially aligned, fairly short fields of near-zero field strength. This may appear in an image like that of FIG. 6 as a column of 0's passing through the defective region. It is clearly possible to apply the present invention non-destructively by simply identifying and ignoring this column. It is generally preferable, however, to overwrite a defective servo region with a uniform pattern before obtaining the read signals to be combined and interpreted.

Figure 7:
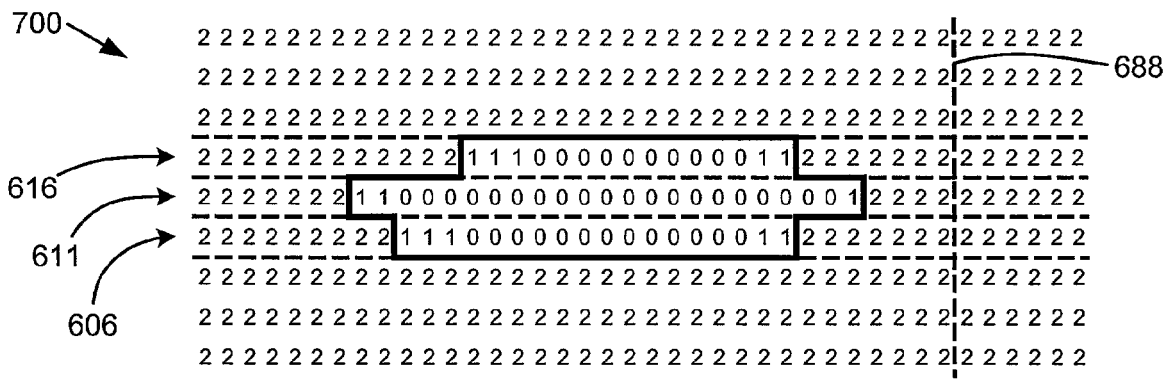
FIG. 7 shows another image of the defect of FIG. 6.

Referring now to FIG. 7, there is shown an image of defect 658 that is spliced together by only three passes of the transducer head adjacent the defect. As shown, these passes were at track 606, 611, and 616. Although this is not a satisfactory image of the defect for visual scrutiny, it is adequate for categorizing the defect according to the method of FIG. 8.

Figure 8:
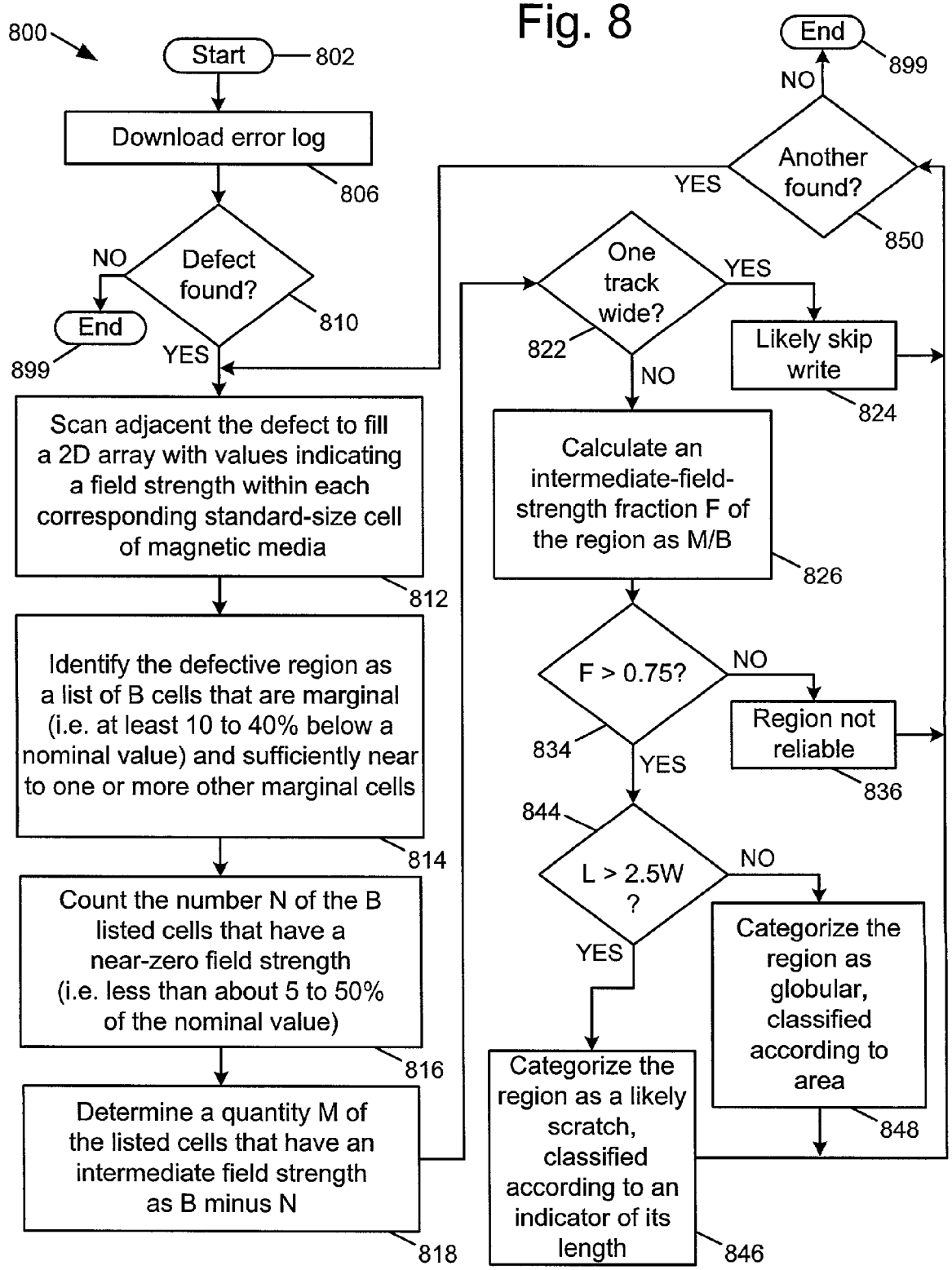
FIG. 8 shows a method for categorizing defects according to the present invention, suitable for automated implementation

FIG. 8 shows a method 800 for categorizing defects according to the present invention, comprising steps 802 to 899. An error log is downloaded 806 by conventional means. If it indicates any defects 810, the defect is scanned at least twice to obtain a two dimensional array of field-strength-related values 812. The number of cells in a contiguous defective region are counted 814, the total being called "B." Of the B cells, the number of them that have a near-zero field strength is counted 816, the total being called "N." The difference is calculated 818 and divided by B, the quotient being labeled as "F" (at step 826).

If the defect is aligned along only one data track 822, it is categorized as a likely skip write 824. For example, the defect shown in the array of FIG. 4 will be interpreted as a likely skip write. Alternatively, the likely skip write profile can include a requirement that the region be verified as re-writeable before the category is assigned.

If the defect does not match the profile of a skip write, quotient F is tested against a threshold of about 50% to 95%. If F does not equal or exceed the threshold 834, the region is categorized as unreliable (or carbon void or corrosion). Otherwise, a length L and width W of the defect are obtained (as described with reference to FIG. 3). If L>2.5 W, then the region is categorized as a likely scratch 846. Otherwise, the region is categorized as globular 848. This process is repeated so long as additional defects are found in the error log 850.

Note that according to this set of defect profiles, FIG. 7 will be categorized as unreliable, just as FIG. 6 was. This illustrates that it is not always necessary to obtain many scans between each two adjacent tracks, nor even one scan for each track passing through the defect. Successful automated characterization such as is illustrated in FIG. 8 can generally be performed successfully in two to five passes adjacent a defect. This is especially effective if the passes can initially be made at multi-track intervals as indicated in FIG. 6, with subsequent passes on adjacent tracks being made in the case of a skip write.

Figure 9:
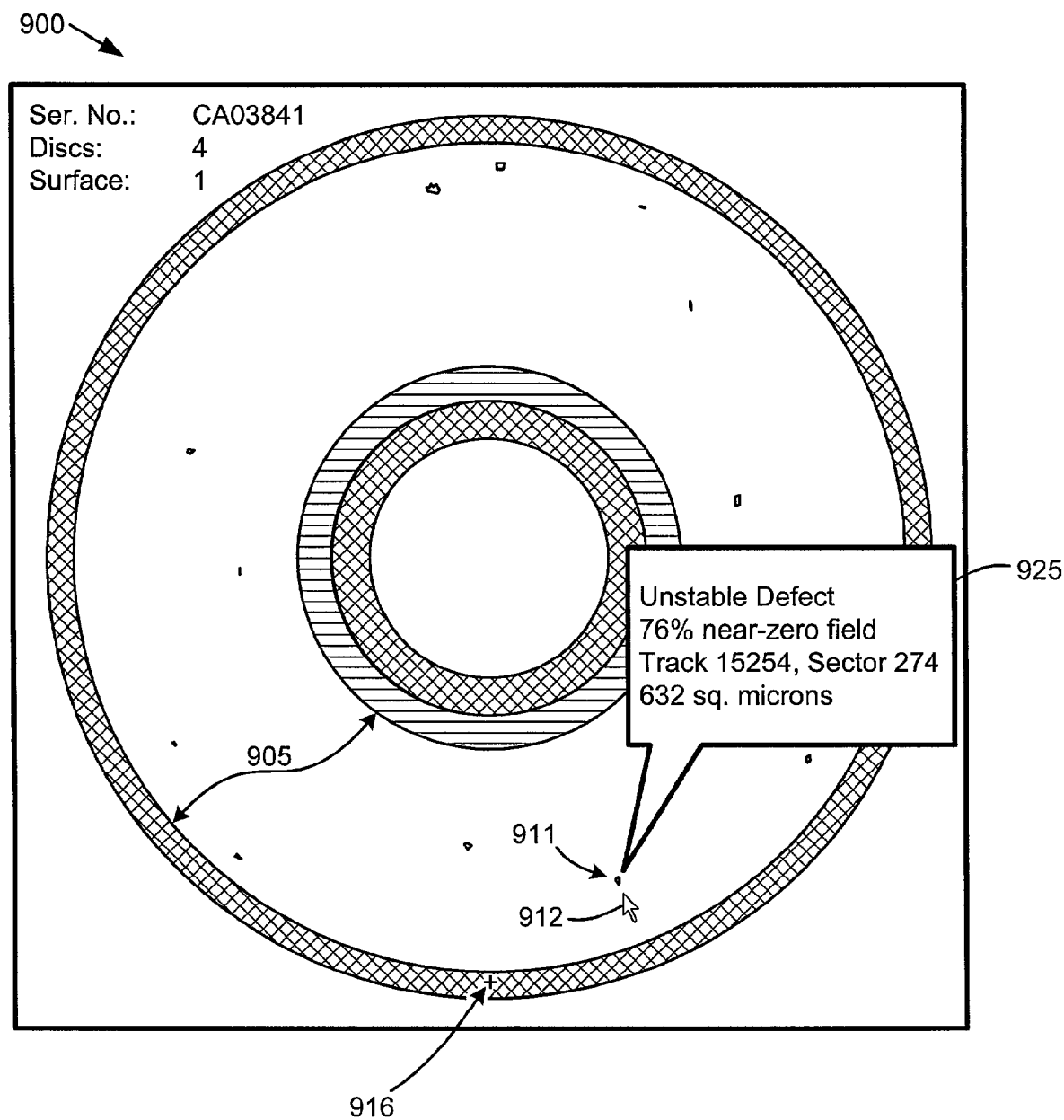
FIG. 9 shows a computer screen display summarizing the defects of one data storage surface of one disc, including information generated by the present invention.

FIG. 9 shows a display 900 summarizing the defects 911 of one data storage surface 905 of one disc. Information about the defects 911 including a category is obtained automatically such as by the method 800 of FIG. 8 and stored in a table (not shown). With such a table derived by use of the present invention, the display 900 can be generated in a highly automated fashion. When a cursor 912 is near enough to a defect 911, a window 925 appears to provide detailed information about the defect, including the defect's location relative to a reference feature 916 that is visible on the physical disc. This display 900 is helpful to a failure analysis professional who has removed the disc from the data storage device and needs to locate, examine, photograph, and test many such defects.

Figure 10:
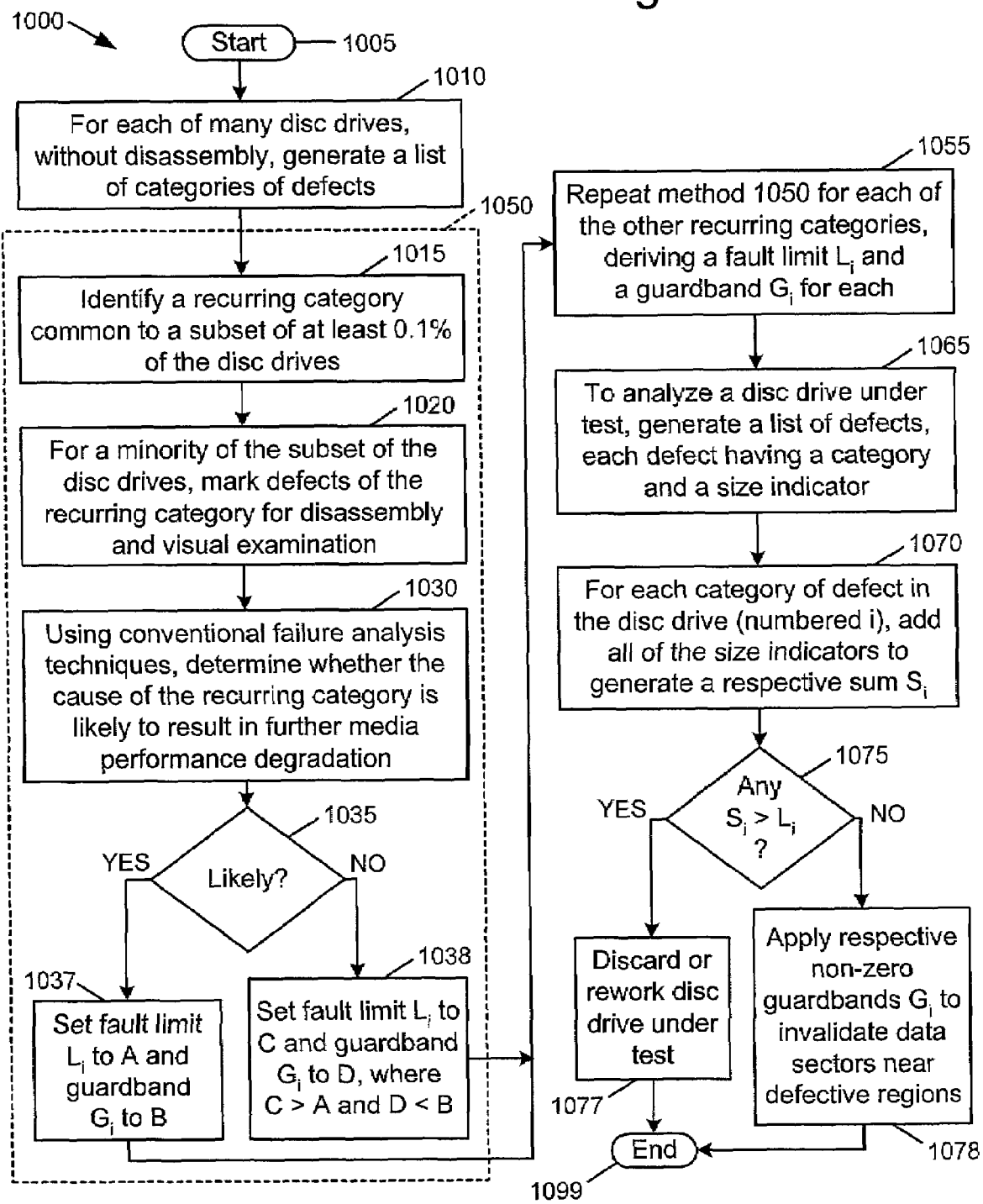
FIG. 10 shows another method of the present invention, particularly suited for application in a manufacturing environment.

FIG. 10 shows a method 1000 comprising steps 1005 through 1099, illustrating a particularly powerful way to use of the present invention in a manufacturing environment. A population of data storage devices is scanned according to a method such as that of FIG. 8, generating a list of defect categories for each data storage device. The lists are merged to generate a list of categories of defects 1010 each with a frequency of occurrence. A sub-method 1050 is performed upon a selected one of the categories having a fairly high frequency of occurrence 1015.

Of the subset of drives having a defect of the selected category, a few sample data storage devices are selected for closer scrutiny. Optionally the defects of the selected category are marked or DC-erased for disassembly and visual examination 1020. Because the defects can be analyzed without disassembling the drives, it is easy to locate quickly a few samples definitely representative of the category (e.g. by data storage device serial number). This is a significant improvement over prior methods in which failure analysis was performed on numerous drives blindly in the hope that all significant failure mechanisms could be found.

After deciding which drives to analyze, conventional failure analysis is used to determine whether the cause of the selected category is likely to result in further performance degradation large enough to be measured 1030. A lower fault limit Li is selected (such as 3 occurrences or 4000 cell areas per surface) for a category associated with a cause that is at least 0.1% likely 1037. Otherwise, a higher fault limit $L_i$ (such as 10 occurrences or 80,000 cell areas per surface) is selected for the category 1038. (Note that "i" is a number corresponding to the category.) Preferably, a fault limit for an unstable-type defect is at least 10% smaller than that for a scratch-type defect.

This sub-method 1050 is repeated for each of the other recurring categories 1055. This generates a list of fault limits $L_1, \ldots, L_N$ and a list of guardbands $G_1, \ldots, G_N$ for each of the N recurring categories. Thereafter, when a data storage device is analyzed 1065, a sum or count of defects of each category can be compared to its associated fault limit 1070 to determine whether the drive is satisfactory 1075. Unsatisfactory drives are discarded or reworked 1077, and satisfactory drives have defect tables modified to implement guardbands 1078.

Alternatively characterized, a first embodiment of the present invention is a method (such as 500,800) or apparatus (such as 106,175) for analyzing a data storage device (such as 100) containing a transducer head (such as 134) positionable adjacent a data storage media surface. First, a defect (such as 270, 358, 658) is detected in a region of the surface. At least two readback signals are obtained (such as by steps 523,541), each received during a respective pass of the transducer head adjacent the defective region. It is also desirable to obtain additional readback signals characterizing nearby regions (such as 260,603) with greater clarity. The signals are then combined to define a category for the defective region, either automatically (e.g. by circuitry on controller board 106 or analyzer 175, configured to implement method 800) or by visual examination (see FIG. 5). Preferably, all of the read signals are received from the transducer head while the data storage device remains sealed with a top cover (such as 123), and at most about 5% of a population of data storage devices are ever actually disassembled for visual analysis.

In a second embodiment, a value is assigned (such as a length value assigned in step 846 of FIG. 8) to each of the defective regions belonging to a category. The data storage device is disqualified (such as by step 1077) if an aggregation of the assigned values exceeds a predetermined threshold (such as a distance of one thousand nominal track widths). Otherwise, the data storage device is usually qualified (i.e. marked as acceptable). The threshold is preferably determined according to an outcome of conventional failure analysis (such as by method 1050), which assesses the general level of risk that the cause of the defective region will cause subsequent loss of media performance. Advantageously, this method requires such analysis for at most a minority of the data storage devices having defects in that category.

In a third embodiment, a taxonomy having only a small number (at most 10 to 100) of primary categories is defined, each with a respective profile (such as by method 800). That is to say that the assigning step is completed while the combination of readback signals has been compared against a small number of profiles each corresponding to a respective category, the assigned category being one of the respective primary categories. In this way, the defective region is meaningfully described in a taxonomy having at most about 100 identifiers. (Note that a "primary" category is defined to exclude categories having profiles that are so narrow that no defects match the profile in a typical population of 50 devices.)

At least one of the categories is preferably associated with a scratch, and has a profile incorporating a minimum measure of length relative to width (such as by step 844). An least one of the other categories is preferably named as "unreliable" or "corrosion-indicative" or "carbon void." A different action is preferably taken in accordance with whether the defective region is unreliable, such as by invalidating at least one sector near but outside the defect (e.g. by steps 1038 & 1078) that would otherwise be deemed acceptable for user data.

In a fourth embodiment, the read data from the passes of the first embodiment are combined to generate a useful topographical image (exemplified by FIG. 2) plotting an indicator of field strength against a two-dimensional indicator of position with respect to the media surface. For decent resolution, the passes are preferably taken in reasonably close radial proximity to one another (i.e. 1–2 track widths or less, also exemplified by FIG. 2). From this image, the defect is visually identified as a likeliest one of a predetermined set of known defect types each having a name, which is manually assigned as the category for the defective region.

In a fifth embodiment, the first embodiment is modified to include a step of deriving an estimate of how much of the defective region is characterized by a less-than-nominal, intermediate field strength (such as by step 826). Next, the defective region is deemed unreliable if the estimate is lower than a predetermined threshold (such as by steps 834 and 836). Otherwise, the region is not generally indicated as unreliable.

In a sixth embodiment, the defective region is deemed unreliable if a substantial portion of the defective region (i.e. about 30% to about 99%) has a near-zero field strength. For automatic testing or finding defects, and to accelerate analysis of large defects (wider than 100 tracks), it is preferred that a reduced number of passes (i.e. one per several tracks) be used. For example, applying method 800 to the data of FIG. 7, B=56, N=43, M=13, and F=0.23. The defect is more than one track wide, so its category is "unreliable," as established at step 836. This is the same result as would be obtained if method 800 were applied to the entire defective region of FIG. 6.

All of the structures and methods described above will be understood to one of ordinary skill in the art, and would enable the practice of the present invention without undue experimentation. It is to be understood that even though numerous characteristics and advantages of various embodiments of the present invention have been set forth in the foregoing description, together with details of the structure and function of various embodiments of the invention, this disclosure is illustrative only. Changes may be made in the details, especially in matters of structure and arrangement of parts within the principles of the present invention to the full extent indicated by the broad general meaning of the terms in which the appended claims are expressed. For example, steps of the above methods can be reordered while maintaining substantially the same functionality, without departing from the scope and spirit of the present invention. In addition, although the preferred embodiments described herein are largely directed to manufacturing disc drives, it will be appreciated by those skilled in the art that many teachings of the present invention can be applied to self-testing of disc drives without departing from the scope and spirit of the present invention.

What is claimed is:

1. A method comprising imaging a characteristic size of a defective region of a data storage medium by combining a plurality of data readback signals received from different tracks adjacent the defective region, and indicating that the defective region is unreliable if a ratio defined by a size of a portion of the defective region with a less-than-expected readback signal strength compared to a total size of the detective region is greater than a preselected threshold.

2. The method of claim 1 further comprising categorizing the defective region by comparing the characteristic size of the defective region to a plurality of predefined category profiles.

3. The method of claim 2 wherein the categorizing step comprises identifying the defective region as likely being characteristic of a scratch.

4. The method of claim 1 wherein the imaging step comprises representing an array of data points each having independent coordinates X and Y with respect to the data storage media.

5. The method of claim 4 wherein the imaging step comprises representing an array of data points wherein each X and Y coordinate is associated with a corresponding Z coordinate relating to a strength of the associated readback signal.

6. The method of claim 2 wherein the categorizing step comprises identifying the defective region as likely being characteristic of corrosion.

7. The method of claim 1, further comprising:
    modifying a list of bad sectors in a manner that depends upon the imaging step; and
    retaining the modified list in a memory.

8. A data storage apparatus comprising a list of bad sectors that is modified according to the method of claim 7 and stored in a memory.

9. The method of claim 2, further comprising:
    assigning a value to each of the defective regions according to the categorizing step; and
    reworking the data storage medium if an aggregation of the assigned values exceeds a predetermined threshold.

10. The method of claim 1 in which the imaging step comprises receiving all of the plurality of readback signals from a transducer head of a sealed data storage apparatus in which the medium is rotated.

11. The method of claim 3 wherein the categorizing step identifies the defective region as likely being characteristic of a scratch if the characteristic size comprises a length that is greater than a width by a factor of about 2.5.

12. An apparatus comprising:
    a data storage medium comprising a defective region; and
    means for assigning a category for the defective region by combining a plurality of data readback signals received from different tracks adjacent the defective region, wherein the means for assigning comprises means for generating a topographical image of the defective region of the media surface.

13. The apparatus of claim 12 in which the means for assigning comprises defining a profile for each of at least 3 categories defining a set that includes the category assigned for the defective region.

14. The apparatus of claim 12 in which the means for assigning is completed while the combination of readback signals has been compared against at most 30 profiles each corresponding to a respective category, die assigned category being one of the respective categories.

15. The apparatus of claim 12 in which the means for assigning comprises a category identifier indicating whether the defective region is likely to contain a scratch.

16. The apparatus of claim 12 in which the means for assigning is configured to receive all of the plurality of read signals from the transducer head while the media storage and transducer head are sealed in a substantially opaque chamber.

* * * * *